(12) United States Patent
Ditzler

(10) Patent No.: US 10,086,928 B2
(45) Date of Patent: Oct. 2, 2018

(54) ELECTRICALLY POWERED DOWNLOCK ACTUATION SYSTEM

(71) Applicant: Goodrich Corporation, Charlotte, NC (US)

(72) Inventor: Adam J. Ditzler, Fort Worth, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 213 days.

(21) Appl. No.: 15/224,096

(22) Filed: Jul. 29, 2016

(65) Prior Publication Data

US 2018/0029697 A1 Feb. 1, 2018

(51) Int. Cl.
*B64C 25/26* (2006.01)
*B64C 25/20* (2006.01)

(52) U.S. Cl.
CPC .............. *B64C 25/20* (2013.01); *B64C 25/26* (2013.01)

(58) Field of Classification Search
CPC ......... B64C 25/20; B64C 25/22; B64C 25/24; B64C 25/26
See application file for complete search history.

(56) References Cited

U.S. PATENT DOCUMENTS

| 2,507,962 | A | 5/1950 | Clark et al. |
| 2,668,030 | A | 2/1954 | Smith et al. |
| 2,896,884 | A | 7/1959 | Perdue |
| 5,269,481 | A | 12/1993 | Derrien |
| 8,292,219 | B2 | 10/2012 | Collins |
| 8,590,835 | B2 | 11/2013 | Ditzler |
| 8,602,352 | B2 | 12/2013 | Keller |
| 8,991,753 | B2 | 3/2015 | Mellor et al. |
| 9,227,724 | B2 | 1/2016 | Schmidt |
| 2011/0233327 | A1* | 9/2011 | Mellor .................... B64C 25/34 244/102 A |
| 2011/0278394 | A1* | 11/2011 | Ditzler .................... B64C 25/26 244/102 SL |
| 2015/0314861 | A1 | 11/2015 | Paddock et al. |
| 2017/0057625 | A1* | 3/2017 | Mellor .................... B64C 25/52 |

FOREIGN PATENT DOCUMENTS

| EP | 2130765 | A2 | 12/2009 |
| EP | 2386487 | A2 | 11/2011 |
| EP | 3020632 | A1 | 5/2016 |
| GB | 2498208 | A | 7/2013 |
| GB | 2501906 | A | 11/2013 |
| WO | 2015040364 | | 3/2015 |

OTHER PUBLICATIONS

Extended European Search Report dated Nov. 30, 2017 in Application No. 17183564.8.

* cited by examiner

*Primary Examiner* — Richard G Davis
(74) *Attorney, Agent, or Firm* — Snell & Wilmer, L.L.P.

(57) ABSTRACT

A downlock actuator may comprise an electric motor, a gearbox coupled to the electric motor, the gearbox comprising a rotary output shaft, and a connecting output shaft having a first end and a second end, the first end being coupled to the rotary output shaft of the gearbox, wherein the connecting output shaft is configured to rotate between a shaft locked position and a shaft unlocked position, wherein the gearbox is back-drivable in response to the connecting output shaft being in the shaft unlocked position.

19 Claims, 5 Drawing Sheets

ELECTRICALLY POWERED DOWNLOCK ACTUATION SYSTEM

FIELD

This disclosure relates to an electrically powered downlock actuation system attachable to a landing gear brace, and more specifically to an electrically powered downlock actuation system that uses the rotary output of the motor to directly drive a landing gear brace locking mechanism.

BACKGROUND

Landing gear assemblies are configured to retract the landing gear of an aircraft after takeoff and/or deploy the landing gear before landing. Landing gear assemblies may include locking linkage systems, comprising a downlock actuator, configured to actuate the locking and unlocking of the locking linkage system. When in an unlocked position, during landing gear retraction and/or extension, components within the downlock actuator may translate longitudinally in response to movement within the locking linkage system or landing gear assembly as a whole.

SUMMARY

In various embodiments, a locking linkage system of a landing gear assembly may comprise a lockable assembly comprising an upper brace defining a longitudinal axis, a lower brace coupled to the upper brace, and a linkage coupled to the upper brace and the lower brace, the linkage being configured to allow movement of the upper brace and the lower brace relative to one another between unlocked and locked positions. The locking linkage system may further comprise a downlock actuator comprising an electric motor coupled to the upper brace, a gearbox coupled to the electric motor, and a connecting output shaft having a first end and a second end, the first end coupled to a rotary output shaft of the gearbox, wherein the connecting output shaft is configured to rotate between a shaft locked position and a shaft unlocked position. The gearbox may be back-drivable in response to the connecting output shaft being in the shaft unlocked position. The downlock actuator may be configured to toggle the linkage, the upper brace, and the lower brace between the unlocked and locked positions.

In various embodiments, the locking linkage system may further comprise a link rod having a proximal end coupled to the second end of the connecting output shaft and a distal end coupled to the lockable assembly. In various embodiments, the linkage may comprise an upper lock link pivotally coupled to a lower lock link, wherein the upper lock link is coupled to the upper brace and the lower lock link is coupled to the lower brace. In various embodiments, the locking linkage system may further comprise an output shaft position sensor proximate the connecting output shaft, wherein output shaft position sensor is configured to detect a position of the connecting output shaft. In various embodiments, the proximal end of the link rod may be pivotally coupled to the second end of the connecting output shaft. In various embodiments, the rotary output shaft may be positioned substantially perpendicular to a longitudinal axis of the link rod. In various embodiments, the electric motor may be controllable to produce a desired angular range of motion of the connecting output shaft between the shaft locked position and the shaft unlocked position.

In various embodiments, the link rod may be mounted for longitudinal translation relative to the longitudinal axis of the upper brace and rotation relative to the connecting output shaft whereby the proximal end of the link rod moves away from the upper brace and the distal end of the link rod moves toward the upper brace to unlock the upper brace and the lower brace from a locked position to an unlocked position. In various embodiments, the gearbox may be fixedly coupled to the electric motor, the rotary output shaft may be fixedly coupled to the gearbox, and/or the connecting output shaft may be fixedly coupled to the rotary output shaft.

In various embodiments, a downlock actuator for a landing gear system may comprise an electric motor, a gearbox coupled to the electric motor, the gearbox comprising a rotary output shaft, and a connecting output shaft having a first end and a second end, the first end being coupled to the rotary output shaft of the gearbox, wherein the connecting output shaft is configured to rotate between a shaft locked position and a shaft unlocked position. The gearbox may be back-drivable in response to the connecting output shaft being in an intermediate unlocked position and/or the shaft unlocked position, wherein the intermediate unlocked position is between the shaft locked position and the shaft unlocked position. In various embodiments, the downlock actuator may further comprise a link rod having a proximal end coupled to the second end of the connecting output shaft and a distal end coupled to a lockable assembly which includes a linkage, an upper brace, and a lower brace, and wherein, the connecting output shaft and the link rod are configured to toggle the linkage, the upper brace, and the lower brace between unlocked and locked positions.

In various embodiments, the downlock actuator may further comprise an output shaft position sensor proximate to the connecting output shaft configured to detect a position of the connecting output shaft. In various embodiments, the electric motor may be controllable to produce a desired angular range of motion of the connecting output shaft between the shaft locked position and the shaft unlocked position. In various embodiments, the gearbox may be fixedly coupled to the electric motor, the rotary output shaft may be fixedly coupled to the gearbox, and/or the connecting output shaft may be fixedly coupled to the rotary output shaft. In various embodiments, a longitudinal axis of the link rod may be substantially perpendicular to a rotational axis of the connecting output shaft.

In various embodiments, a method of positioning an upper brace and a lower brace of an aircraft landing gear system in a desired relationship with one another may comprise rotating an electric motor in a desired rotational direction, rotating a rotary output shaft of a back-drivable gearbox coupled to the electric motor, rotating a connecting output shaft through a desired angular range between a shaft locked position and a shaft unlocked position, wherein the connecting output shaft comprises a first end coupled to the rotary output shaft and a second end, and translating a link rod comprising a proximal end coupled to the second end of the connecting output shaft and a distal end, in a first longitudinal direction along a longitudinal axis defined by the link rod, wherein the distal end is coupled to a lockable assembly comprising a linkage, the upper brace, and the lower brace. The linkage, the upper brace, and the lower brace may be configured to lock the upper brace and the lower brace in the desired relationship depending on a position of the linkage.

In various embodiments, the method may further comprise back-driving the back-drivable gearbox, while the connecting output shaft is in an intermediate unlocked position and/or the shaft unlocked position, in response to the link rod moving in at least one of the first longitudinal direction or a second longitudinal direction along the longitudinal axis, wherein the second longitudinal direction is opposite the first longitudinal direction. In various embodiments, the method may further comprise controlling the electric motor using motor control electronics, wherein the controlling includes limiting the desired angular range of the connecting output shaft between the shaft locked position and the shaft unlocked position. In various embodiments, the method may further comprise detecting a shaft position of the connecting output shaft with an output shaft position sensor located proximate the connecting output shaft.

In various embodiments, translating the link rod may comprise at least one of translating the link rod from the shaft locked position and stopping at the shaft unlocked position in response to the output shaft position sensor detecting the connecting output shaft arriving at the shaft unlocked position, or translating the link rod from the shaft unlocked position and stopping at the shaft locked position in response to the output shaft position sensor detecting the connecting output shaft arriving at the shaft locked position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. In the figures, like referenced numerals may refer to like parts throughout the different figures unless otherwise specified.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

This disclosure generally relates to an electrically powered downlock actuation system, or downlock actuator, for landing gear braces, such as the braces in a locking linkage system making up a landing gear drag brace or side brace. Electrically actuated downlock actuators present a different set of challenges relative to hydraulically powered downlock actuators. For example, the electrical actuation components should fit substantially within the same space constraints or spatial envelope, not substantially increase the weight of the overall downlock actuation system, and minimize force inefficiencies in the overall landing gear design. Generally, electrically powered linear actuators may lose efficiency in converting rotary motor output into linear motion. In various embodiments, a locking linkage system includes a downlock actuator, which may be electrically-powered, for a landing gear system that does not convert rotary motor output into linear motion during the actuation process, but instead uses the rotary motor output to directly drive a locking mechanism coupled to a landing gear brace. The locking linkage system substantially fits within the same space constraints as hydraulically powered downlock actuators and achieves adequate reliability and maintainability ratings.

Figure 1A:
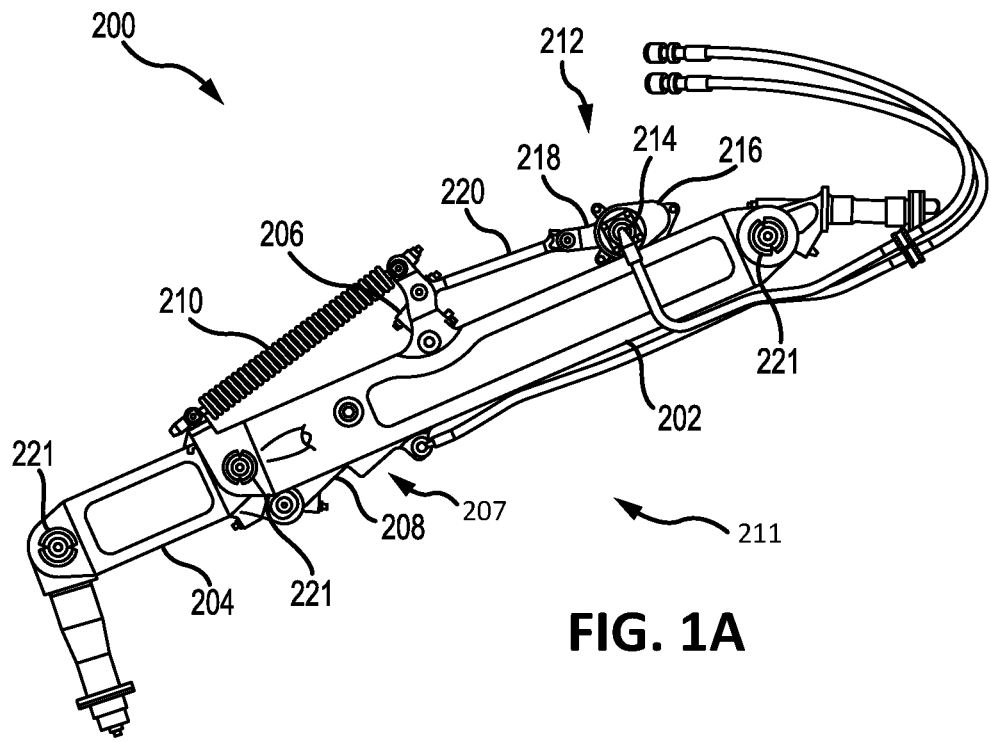
FIG. 1A illustrates a side view of a locking linkage system for a landing gear system, in accordance with various embodiments.
Figure 1B:
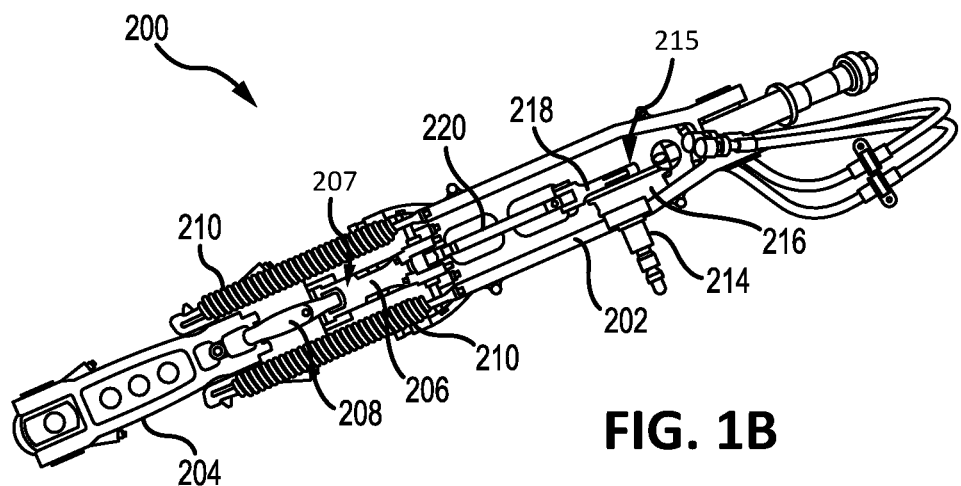
FIG. 1B illustrates a top view of a locking linkage system for a landing gear system, in accordance with various embodiments.

FIGS. 1A and 1B show locking linkage system 200, which is part of a landing gear assembly comprising a lockable assembly 211. Lockable assembly 211 may comprise an upper brace 202, a lower brace 204, and a linkage coupled between upper brace 202 and lower brace 204. In various embodiments, locking linkage system 200 operates upper brace 202 relative to lower brace 204, such as by moving (e.g., rotating) lower brace 204 relative to upper brace 202. Lockable assembly 211 comprises coupling pins 221 which couple the various components of locking linkage system 200 together. Braces 202, 204 are coupled together via the linkage which comprises upper and lower lock links 206, 208, respectively. Upper lock link 206 is pivotally coupled to lower lock link 208. Lock springs 210 are coupled to upper brace 202 and upper lock link 206, although there are many other ways that lock springs 210 may be attached, and lock springs 210 may be attached to locking linkage system 200 at points other than upper brace 202 and upper lock link 206. Lock springs 210 may take the form of extension springs that provide a tensile force to pull upper lock link 206 into a locked position, but other types of springs may be used.

In various embodiments, locking linkage system 200 may further comprise a downlock actuator 212, which is electrically powered, that may replace or be initially installed in lieu of a conventional hydraulic downlock actuator. Downlock actuator 212 may comprise an electric motor 214, a back-drivable gearbox 216, a connecting output shaft 218 (extending from back-drivable gearbox 216), and a link rod 220, which may take the form of a fixed-length link rod. Downlock actuator 212 may take the form of an electric rotary mechanism with no linear motion output, but instead provides rotary output, driving connecting output shaft 218. Electric motor 214 and/or back-drivable gearbox 216 may be rigidly coupled to upper brace 202. Electrical power cords are arranged to supply electrical power to electric motor 214 and sensors. Downlock actuator 212 may be configured to toggle the linkage, upper brace 202, and lower brace 204 between an unlocked position and a locked position. As depicted in FIGS. 1A and 1B, the linkage is positioned in locked link position 207.

In various embodiments, electric motor 214 and back-drivable gearbox 216 may be positioned such that a rotary output shaft 215 coupled to back-drivable gearbox 216 is substantially perpendicular to the linear direction of motion required. Stated another way, rotary output shaft 215 of back-drivable gearbox 216 may be positioned substantially perpendicular to a longitudinal axis of link rod 220 and/or perpendicular to a plane of motion defined as a plane that is orthogonal to the axes of coupling pins 221. In turn, link rod 220 couples to connecting output shaft 218 at a location displaced from a centerline of rotation of back-drivable gearbox 216 or rotary output shaft 215.

Figure 2A:
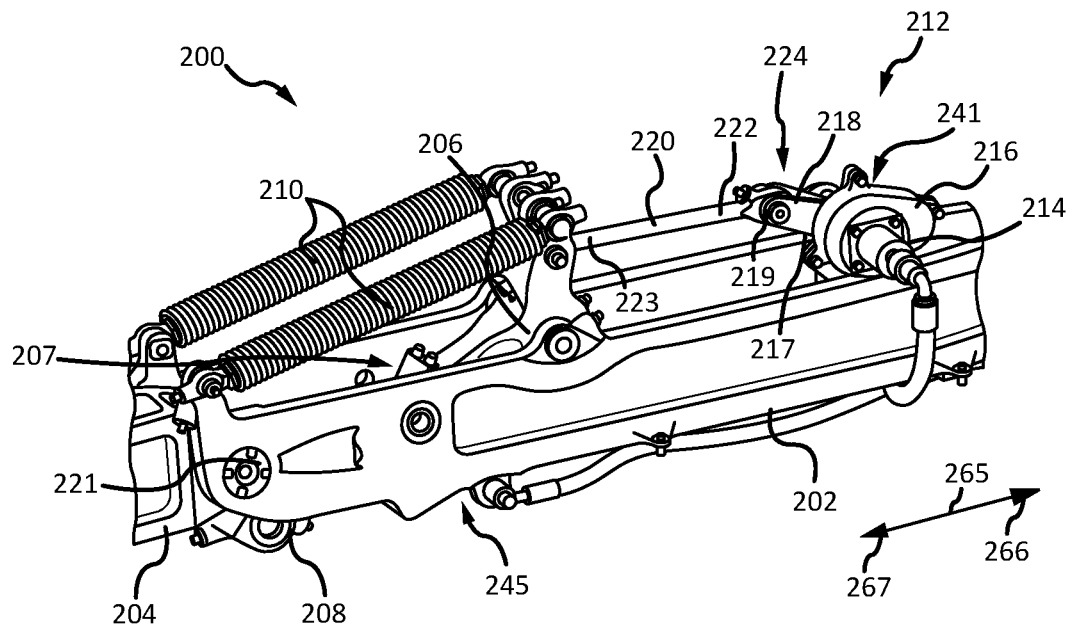
FIG. 2A illustrates a perspective view of a locking linkage system in a shaft locked position, in accordance with various embodiments.
Figure 2B:
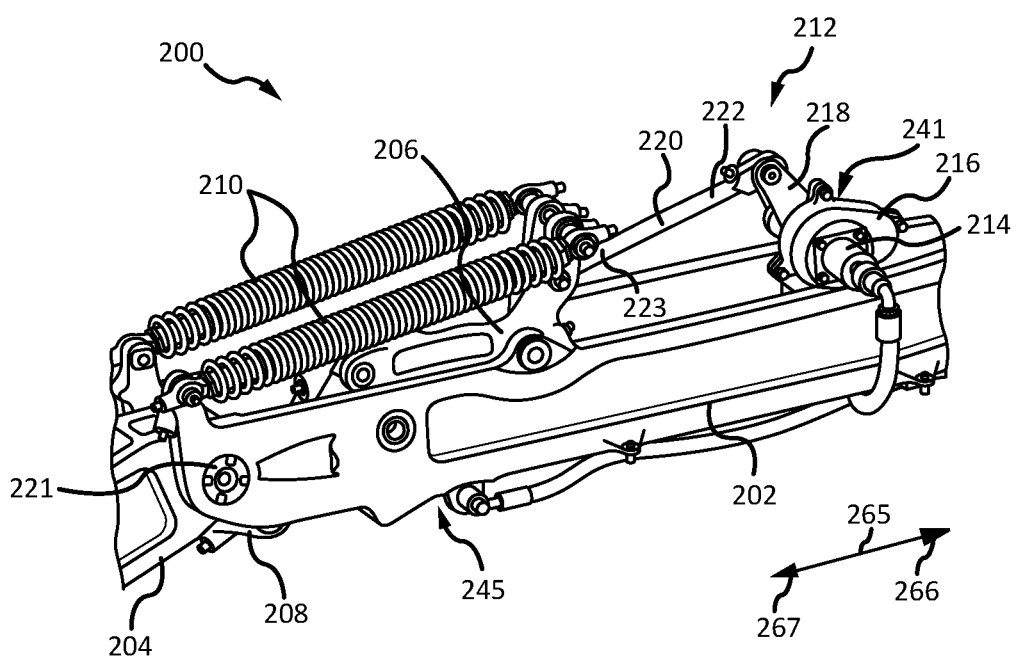
FIG. 2B illustrates a perspective view of a locking linkage system in an intermediate unlocked position, in accordance with various embodiments.
Figure 3:
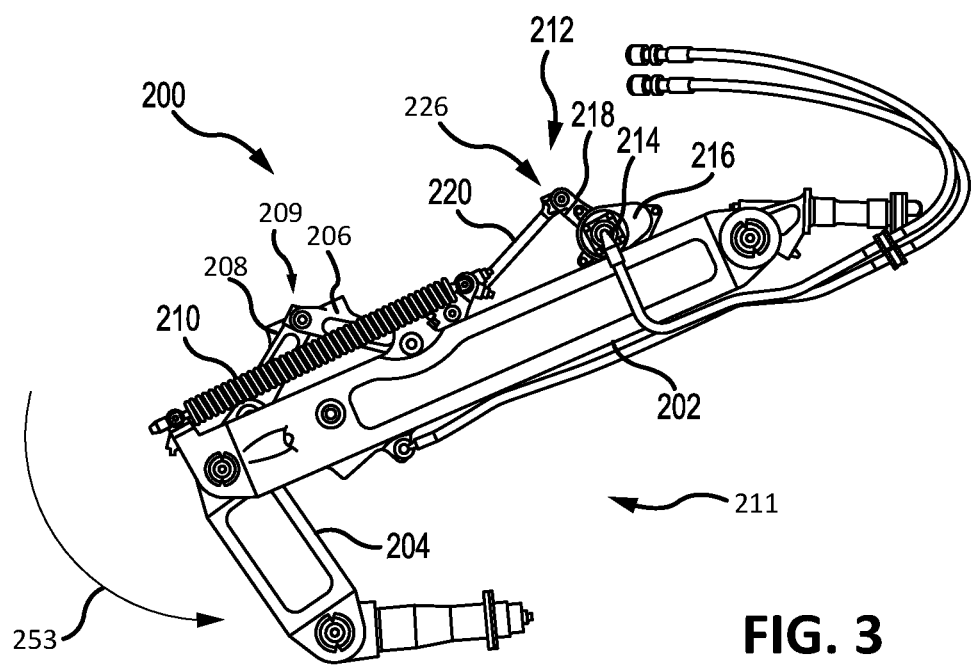
FIG. 3 illustrates a side view of a locking linkage system for a landing gear system in a shaft unlocked position, in accordance with various embodiments.

With reference to FIGS. 2A, 2B, and 3, elements with the like element numbering between figures are intended to be the same and will not be repeated for the sake of clarity. In various embodiments, a first shaft end 217 of connecting output shaft 218 may be coupled to rotary output shaft 215 (depicted in FIG. 1B) of back-drivable gearbox 216. In various embodiments, rotary output shaft 215 may be fixedly coupled to back-drivable gearbox 216. A second shaft end 219 of connecting output shaft 218 may be coupled to a proximal end 222 of link rod 220. A distal end 223 of link rod 220 may be coupled to the linkage, such as upper lock link 206.

In various embodiments, link rod 220 operates to drive motion in lock links 206, 208. Link rod 220 may be mounted for longitudinal translation, substantially parallel to longitudinal axis 265 defined by upper brace 202, and rotation, relative to the connecting output shaft 218, whereby proximal end 222 of link rod 220 moves away from upper brace 202 and distal end 223 of link rod 220 moves toward upper brace 202 to unlock braces 202, 204 from the locked position to the unlocked position. Electric motor 214 may include motor control electronics that are programmable to control an angular position of connecting output shaft 218. In various embodiments, the motor control electronics may be programmed using output position feedback detected by an output shaft position sensor 241 coupled to locking linkage system 200 proximate to connecting output shaft 218. In various embodiments, a signal from output shaft position sensor 241 indicating that connecting output shaft 218 has reached a desired position may result in electric motor 214 being shut off at the desired position. In various positions, connecting output shaft 218 may remain in the desired position unless a load is applied to it by link rod 220.

With further reference to FIGS. 2A, 2B, and 3, back-drivable gearbox 216 may provide a speed reduction between electric motor 214 and connecting output shaft 218 such that operation of electric motor 214 may produce a limited angular range of motion of connecting output shaft 218 between a shaft locked position 224 and a shaft unlocked position 226. The motor control electronics could also be used to provide precise control of a position of connecting output shaft 218 over a desired angular range, which may be a limited angular range between shaft locked position 224 and shaft unlocked position 226. In various embodiments, back-drivable gearbox 216 may be back-drivable, meaning that a load applied to connecting output shaft 218 by link rod 220 may rotate connecting output shaft 218, gears within back-drivable gearbox 216, and/or electric motor 214.

In various embodiments, back-drivable gearbox 216 may comprise a gear train that has a low gear ratio. A low gear ratio, as used herein, may be from about 2:1 to about 150:1, or from about 20:1 to about 120:1, or from about 50:1 to about 100:1. Low gear ratio gearboxes, such as back-drivable gearbox 216, are easier to back-drive than non-low gearboxes due to low reflected inertia. Stated another way, the reflected inertia at back-drivable gearbox 216 is low enough to allow movement of the gears within back-drivable gearbox 216 in response to a load being applied to connecting output shaft 218 by link rod 220. It should be noted that gear ratio, N, equals output torque, $\tau_o$, divided by the input torque, $\tau_i$, as illustrated by:

$$N = \frac{\tau_o}{\tau_i}$$

Or, stated another way:

$$N\tau_i = \tau_o$$

In addition, lower gear ratio gearboxes exhibit lower amounts of reflected inertia seen at a motor. Reflected load inertia may be expressed as below, where $J_r$ is the reflected load inertia, $J_1$ is the inertia of the load (i.e., the transmission) and N is the gear ratio:

$$J_r = \frac{J_1}{N^2}$$

Of course, the gear ratio is inversed when viewed from the perspective of the motor. For example, a 1:2 gear ratio becomes a 2:1 gear ratio when viewed from the perspective of the motor. As $N^2$ is in the denominator, small changes in gear ratio may have a significant effect on reflected load inertia. It should further be noted that the total inertia seen at a motor is equal to the reflected inertia plus the inertia of the motor itself, which is shown below, where $J_m$ is the inertia of the motor.

$$J_r = \frac{J_1 + J_m}{N^2}$$

The inertia of a transmission ($J_1$) may be calculated using any suitable means known in the art. As an example, for a solid cylinder, inertia is shown below, where J is inertia, W is mass, R is radius, and g is the gravity of the Earth (recognized to be about 9.8 m/s$^2$):

$$J = \frac{WR^2}{2g}$$

Accordingly, back-drivable gearbox 216, having a low gear ratio, creates a low level of reflected load inertia seen at rotary output shaft 215 and/or connecting output shaft 218.

Shaft locked position 224 is the position of connecting output shaft 218 which causes downlock actuator 212 to lock upper lock link 206 and lower lock link 208, and upper brace 202 and lower brace 204, such that braces 202, 204 are substantially along a longitudinal axis defined by upper brace 202, parallel to longitudinal axis 265, which results in the landing gear of an aircraft being fully extended. Upper lock link 206 and lower lock link 208 are in locked link position 207 (as depicted in FIGS. 1A and 2A) in response to connecting output shaft 218 being in shaft locked position 224. Shaft locked position 224 is the closest position that connecting output shaft 218 may rotate about electric motor 214 and/or back-drivable gearbox 216 toward upper brace 202, creating a minimum angle between upper brace 202 and connecting output shaft 218.

An intermediate unlocked position is any position of connecting output shaft 218 between shaft locked position 224 and shaft unlocked position 226 at which output shaft position sensor 241 senses that lock links 206, 208 are positively unlocked so upper brace 202 and lower brace 204 may move relative to one another to allow retraction of the landing gear, such as lower brace 204 moving in direction 253. Upper lock link 206 and lower lock link 208 may be in unlocked link position 209, or moving toward unlocked link position 209 (as depicted in FIG. 3), in response to connecting output shaft 218 being in an intermediate unlocked position.

Shaft unlocked position 226 is the furthest position that connecting output shaft 218 may rotate about electric motor 214 and/or back-drivable gearbox 216 away from upper brace 202, creating a maximum angle between upper brace 202 and connecting output shaft 218. Similar to an intermediate unlocked position, in response to connecting output shaft 218 being in shaft unlocked position 226, upper lock link 206 and lower lock link 208 may be in unlocked link position 209, or moving toward unlocked link position 209 (as depicted in FIG. 3).

In various embodiments, locking linkage system 200 may comprise a link position sensor 245 disposed proximate to upper lock link 206 and/or lower lock link 208. Link position sensor 245 may be configured to detect the position of lock links 206, 208, whether they are in locked link position 207 or unlocked link position 209, or somewhere between locked link position 207 and unlocked link position 209, i.e., an intermediate unlocked link position.

Figure 4:
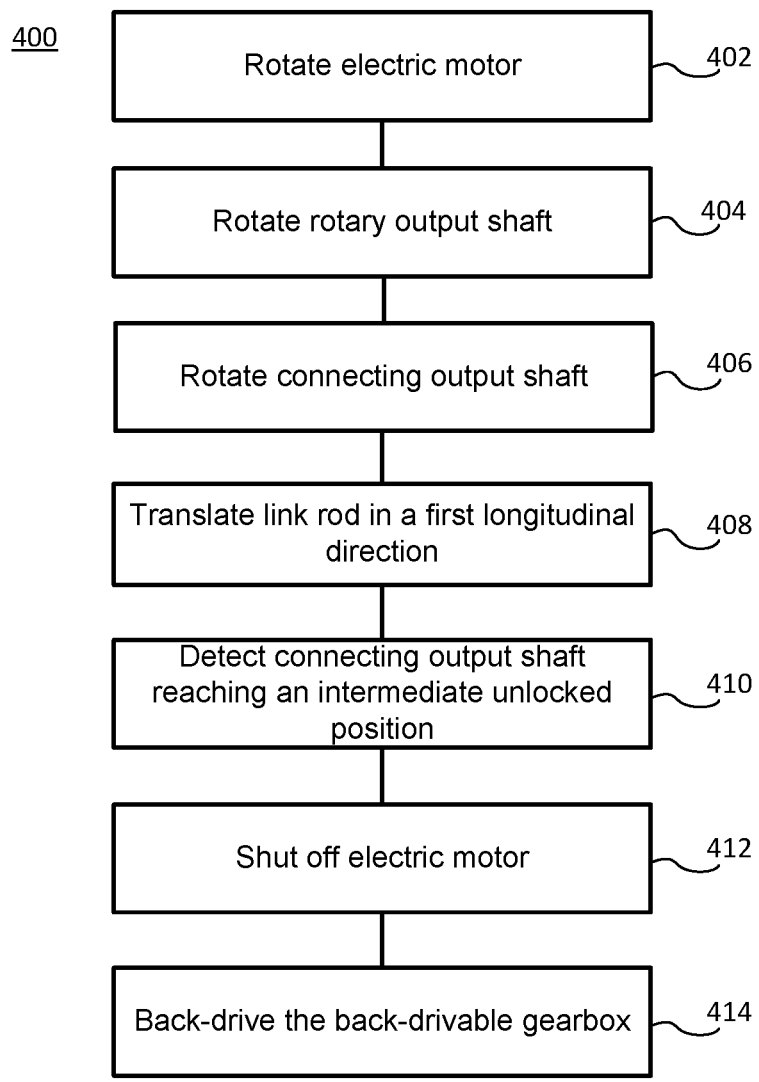
FIG. 4 illustrates a method for unlocking a locking linkage system to allow retraction of landing gear, in accordance with various embodiments.

FIG. 4 depicts a method 400 for unlocking locking linkage system 200 to allow retraction of the landing gear of an aircraft, in accordance with various embodiments. With combined reference to FIGS. 2A, 2B, 3, and 4, in operation, locking linkage system 200 may begin method 400 with connecting output shaft 218 in shaft locked position 224 and upper lock link 206 and lower lock link 208 in locked link position 207. Electric motor 214 may be rotated (step 402) in response to being powered to rotate. In response to electric motor 214 rotating, rotary output shaft 215 may rotate (step 404), rotary output shaft 215 being coupled to back-drivable gearbox 216. In response, connecting output shaft 218 may rotate (step 406) from shaft locked position 224, away from upper brace 202. In response to the rotation by connecting output shaft 218, link rod 220 may translate in a first longitudinal direction 266 (step 408). In response, link rod 220 may cause upper lock link 206 and lower lock link 208 to rotate from locked link position 207 toward unlocked link position 209, which may unlock locking linkage system 200.

In various embodiments, subsequent to unlocking locking linkage system 200, output shaft position sensor 241 may detect that connecting output shaft 218 has reached an intermediate unlocked position (step 410). Additionally, link position sensor 245 may detect that lock links 206, 208 have reached an intermediate unlocked link position or unlocked link position 209. In response to the detecting by output shaft position sensor 241 and/or link position sensor 245, electric motor 214 may be shut off (step 412). In various embodiments, once locking linkage system 200 has been positively unlocked (i.e., connecting output shaft is in an intermediate unlocked position or shaft unlocked position 226, or lock links 206, 208 are in an intermediate unlocked link position or unlocked link position 209), link rod 220 is not needed to provide a continued force on lock links 206, 208, and in response, electric motor 214 is shut off (step 412). A retract mechanism (not shown) continues to fold locking linkage system 200 during a landing gear retraction (lower brace 204 moves in direction 253 relative to upper brace 202). Lock links 206, 208 go through their defined motion, which is, in turn, realized as longitudinal motion substantially parallel to longitudinal axis 265 of link rod 220. Such longitudinal motion by link rod 220 may cause connecting output shaft 218 to rotate and apply torque to back-drivable gearbox 216 in a rotational direction toward shaft locked position 224 and/or shaft unlocked position 226 (i.e., in a clockwise and/or counterclockwise direction). In response, back-drivable gearbox 216 may be back-driven (step 414) in a rotational direction, toward shaft locked position 224 and/or shaft unlocked position 226 (i.e., in a clockwise and/or counterclockwise direction), by the defined motion of link rod 220 and connecting output shaft 218 following the motion of upper and lower lock links 206, 208 and upper and lower braces 202, 204 during landing gear retraction. Lock links 206, 208 may continue their motion until they reach an intermediate unlocked link position or unlocked link position 209.

In various embodiments, back-drivable gearbox 216 may be designed to be back-drivable to allow back-drivable gearbox 216 and/or electric motor 214 to follow the longitudinal translation of link rod 220, in both first longitudinal direction 266 and second longitudinal direction 267, in response to the defined motion of lock links 206, 208, without disrupting the landing gear retraction processes. For this reason, electric motor 214 and/or back-drivable gearbox 216 may not comprise a clutch. Back-drivable gearbox 216 may be fixedly coupled to electric motor 214, rotary output shaft 215 may be fixedly coupled to back-drivable gearbox 216, and/or connecting output shaft 218 may be fixedly coupled to rotary output shaft 215.

Figure 5:
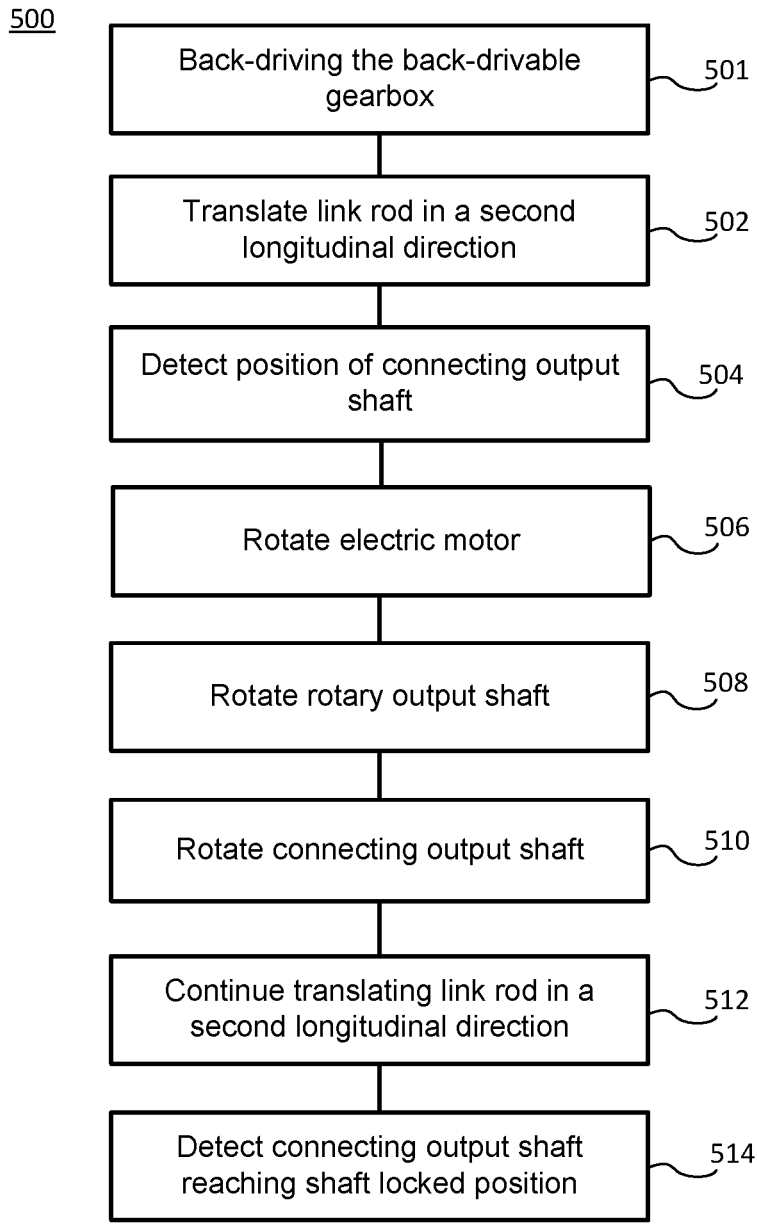
FIG. 5 illustrates a method for locking a locking linkage system, in accordance with various embodiments.

FIG. 5 depicts a method 500 for locking locking linkage system 200, in response to landing gear extension, in accordance with various embodiments. With combined reference to FIGS. 2A, 2B, 3, and 5, in operation, locking linkage system 200 may begin method 500 with connecting output shaft 218 in shaft unlocked position 226 and upper lock link 206 and lower lock link 208 being in unlocked link position 209. In various embodiments, the landing gear extension process may begin with the retract actuator being powered to extend the landing gear. Lower brace 204 moves relative to upper brace 202 in a direction opposite direction 253, which may cause longitudinal translation of link rod 220 in both first and second longitudinal directions 266 and 267, respectively. Back-drivable gearbox 216 allows electric motor 214 and/or back-drivable gearbox 216 to follow such longitudinal motion. Therefore, the longitudinal motion of link rod 220 may back-drive back-drivable gearbox 216 (step 501) and/or electric motor 214.

In various embodiments, link rod 220 may then translate in second longitudinal direction 267 (step 502) as lower brace 204 moves relative to upper brace 202 in a direction opposite direction 253. The translation by link rod 220 of step 502 may cause a load by link rod 220 to be applied to connecting output shaft 218 in second longitudinal direction 267. In response, connecting output shaft 218 may reach a triggering position, and the position of connecting output shaft 218 may be detected (step 504) by output shaft position sensor 241. In response, electric motor 214 may be turned on and powered to rotate (step 506). The triggering position may be the same position or nearly the same position as shaft unlocked position 226, or some other intermediate locked position. In response to electric motor 214 rotating, rotary output shaft 215 may rotate (step 508). Connecting output shaft 218 may rotate (step 510), in response to the rotation of rotary output shaft 215, toward upper brace 202 in response to the rotation of electric motor 214. The rotation of connecting output shaft 218 may continue to translate link rod 220 in second longitudinal direction 267 (step 512). Connecting output shaft 218 may continue applying a load on link rod 220 in second longitudinal direction 267 until connecting output shaft reaches shaft locked position 224. Output shaft position sensor 241 may detect that connecting output shaft 218 reached shaft locked position 224 (step 514), at which point, lock links 206, 208 may be in locked link position 207 and link position sensor 245 may detect the same. In response, electric motor 214 may be shut off.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lock linkage system of a landing gear system, the lock linkage system comprising:
   a lockable assembly comprising:
      an upper brace defining a longitudinal axis;
      a lower brace coupled to the upper brace; and
      a linkage coupled to the upper brace and the lower brace, the linkage being configured to allow movement of the upper brace and the lower brace relative to one another between unlocked and locked positions; and
   a downlock actuator comprising:
      an electric motor coupled to the upper brace;
      a gearbox coupled to the electric motor; and
      a connecting output shaft having a first end and a second end, the first end coupled to a rotary output shaft of the gearbox, wherein the connecting output shaft is configured to rotate between a shaft locked position and a shaft unlocked position,
      wherein the gearbox is back-drivable in response to the connecting output shaft being in the shaft unlocked position,
      wherein, the downlock actuator is configured to toggle the linkage, the upper brace, and the lower brace between the unlocked and locked positions.

2. The lock linkage system of claim 1, further comprising a link rod having a proximal end coupled to the second end of the connecting output shaft and a distal end coupled to the lockable assembly.

3. The lock linkage system of claim 2, wherein the proximal end of the link rod is pivotally coupled to the second end of the connecting output shaft.

4. The lock linkage system of claim 2, wherein the rotary output shaft is positioned substantially perpendicular to a longitudinal axis of the link rod.

5. The lock linkage system of claim 2, wherein the link rod is mounted for longitudinal translation relative to the longitudinal axis of the upper brace and rotation relative to the connecting output shaft whereby the proximal end of the link rod moves away from the upper brace and the distal end of the link rod moves toward the upper brace to unlock the upper brace and the lower brace from a locked position to an unlocked position.

6. The lock linkage system of claim 1, wherein the linkage comprises an upper lock link pivotally coupled to a lower lock link, wherein the upper lock link is coupled to the upper brace and the lower lock link is coupled to the lower brace.

7. The lock linkage system of claim 1, further comprising an output shaft position sensor proximate the connecting output shaft, wherein output shaft position sensor is configured to detect a position of the connecting output shaft.

8. The lock linkage system of claim 1, wherein the electric motor is controllable to produce a desired angular range of motion of the connecting output shaft between the shaft locked position and the shaft unlocked position.

9. The lock linkage system of claim 1, wherein the gearbox is fixedly coupled to the electric motor, the rotary output shaft is fixedly coupled to the gearbox, and the connecting output shaft is fixedly coupled to the rotary output shaft.

10. A downlock actuator for a landing gear system, the downlock actuator comprising:
an electric motor;
a gearbox coupled to the electric motor, the gearbox comprising a rotary output shaft; and
a connecting output shaft having a first end and a second end, the first end being coupled to the rotary output shaft of the gearbox, wherein the connecting output shaft is configured to rotate between a shaft locked position and a shaft unlocked position,
wherein the gearbox is back-drivable in response to the connecting output shaft being in at least one of an intermediate unlocked position or the shaft unlocked position, wherein the intermediate unlocked position is between the shaft locked position and the shaft unlocked position.

11. The downlock actuator of claim 10, further comprising a link rod having a proximal end coupled to the second end of the connecting output shaft and a distal end coupled to a lockable assembly which includes a linkage, an upper brace, and a lower brace, and wherein, the connecting output shaft and the link rod are configured to toggle the linkage, the upper brace, and the lower brace between unlocked and locked positions.

12. The downlock actuator of claim 11, wherein a longitudinal axis of the link rod is substantially perpendicular to a rotational axis of the connecting output shaft.

13. The downlock actuator of claim 10, further comprising an output shaft position sensor proximate to the connecting output shaft configured to detect a position of the connecting output shaft.

14. The downlock actuator of claim 10, wherein the electric motor is controllable to produce a desired angular range of motion of the connecting output shaft between the shaft locked position and the shaft unlocked position.

15. The downlock actuator of claim 10, wherein the gearbox is fixedly coupled to the electric motor, the rotary output shaft is fixedly coupled to the gearbox, and the connecting output shaft is fixedly coupled to the rotary output shaft.

16. A method of positioning an upper brace and a lower brace of an aircraft landing gear system in a desired relationship with one another, comprising:
rotating an electric motor in a desired rotational direction;
rotating a rotary output shaft of a back-drivable gearbox coupled to the electric motor;
rotating a connecting output shaft through a desired angular range between a shaft locked position and a shaft unlocked position, wherein the connecting output shaft comprises a first end coupled to the rotary output shaft and a second end;
translating a link rod, comprising a proximal end coupled to the second end of the connecting output shaft and a distal end, in a first longitudinal direction along a longitudinal axis defined by the link rod, wherein the distal end is coupled to a lockable assembly comprising a linkage, the upper brace, and the lower brace, and back-driving the back-drivable gearbox, while the connecting output shaft is in at least one of an intermediate unlocked position or the shaft unlocked position, in response to the link rod moving in at least one of the first longitudinal direction or a second longitudinal direction along the longitudinal axis, wherein the second longitudinal direction is opposite the first longitudinal direction,
wherein, the linkage, the upper brace, and the lower brace are configured to lock the upper brace and the lower brace in the desired relationship depending on a position of the linkage.

17. The method of claim 16, further comprising controlling the electric motor using motor control electronics, wherein the controlling includes limiting the desired angular range of the connecting output shaft between the shaft locked position and the shaft unlocked position.

18. The method of claim 16, further comprising detecting a shaft position of the connecting output shaft with an output shaft position sensor located proximate the connecting output shaft.

19. The method of claim 18, wherein the translating the link rod comprises at least one of translating the link rod from the shaft locked position and stopping at the shaft unlocked position in response to the output shaft position sensor detecting the connecting output shaft arriving at the shaft unlocked position, or translating the link rod from the shaft unlocked position and stopping at the shaft locked position in response to the output shaft position sensor detecting the connecting output shaft arriving at the shaft locked position.

* * * * *